United States Patent
Jäggi

(10) Patent No.: US 6,919,818 B2
(45) Date of Patent: Jul. 19, 2005

(54) SYSTEM FOR PRODUCING PRINTED PRODUCTS

(75) Inventor: Reto Jäggi, Küttigen (CH)

(73) Assignee: GRAHPHA-Holding AG, Hergiswill (CH)

( * ) Notice: Subject to any disclaimer, the term of this patent is extended or adjusted under 35 U.S.C. 154(b) by 396 days.

(21) Appl. No.: 10/109,894

(22) Filed: Apr. 1, 2002

(65) Prior Publication Data

US 2002/0149497 A1 Oct. 17, 2002

(30) Foreign Application Priority Data

Apr. 4, 2001 (EP) .......................................... 01810338

(51) Int. Cl.[7] .............................................. G08C 19/00
(52) U.S. Cl. .............................. 340/825.72; 340/825.69
(58) Field of Search ...................... 340/825.72, 825.69, 340/825.29, 825.23, 5.23, 5.24, 5.25, 825.36, 7.27, 825.49; 455/456.6, 456.1, 601; 101/484, 219, 426

(56) References Cited

U.S. PATENT DOCUMENTS 4,812,842 A    3/1989  Bayerlein et al.
5,339,073 A  * 8/1994  Dodd et al. ................. 340/5.61
5,541,585 A  * 7/1996  Duhame et al. ........... 340/5.62
6,386,107 B1 * 5/2002  Rancourt ..................... 101/484
6,448,979 B1 * 9/2002  Schena et al. ............... 345/741
6,549,130 B1 * 4/2003  Joao .......................... 307/10.2
6,563,430 B1 * 5/2003  Kemink et al. ........ 340/825.49
6,756,913 B1 * 6/2004  Ayed ..................... 340/825.49

FOREIGN PATENT DOCUMENTS

WO     WO 94/01963 A1    1/1994

* cited by examiner

Primary Examiner—Michael Horabik
Assistant Examiner—Nam Nguyen
(74) Attorney, Agent, or Firm—Venable LLP; Jeffrey W. Gluck

(57) ABSTRACT

The system comprises machines with several processing stations that form a production line for books, magazines, brochures or newspapers. A control device controls the processing stations, and at least one input means operates the processing stations with the control device. The input means is freely movable, and the location or the position of the input means relative to the processing stations is detected automatically.

3 Claims, 4 Drawing Sheets

Figure 1

SYSTEM FOR PRODUCING PRINTED PRODUCTS

CROSS REFERENCE TO RELATED APPLICATION

This application claims the priority of European Patent Application No. 01810338.2 filed in the European Patent Office on Apr. 4, 2001, the disclosure of which is being incorporated herein by reference.

BACKGROUND OF THE INVENTION

The invention relates to a system for producing printed products.

Systems of the aforementioned type, for example, book binding lines, assembly lines for inserting the book blocks into the book covers, systems for producing wire-stitched magazines, brochures or the like with the aid of gathering and wire-stitching machines, as well as systems for producing ready for shipment newspapers in a mail room, primarily consist of machines provided with several processing stations for processing the printed products in a process series. For the book binding line, these machines in particular include a gathering machine, a transfer device, an adhesive binder, a removal system, a distribution guide, a separating saw, a three-knife trimmer, a counting stacker, a foil-laminating machine and a palletizer.

Sequentially aligned signature feeding devices, gathering machines with signature feeders as processing stations, a wire-stitching machine and a cutting machine are jointly used for the production of wire-stitched magazines.

For newspaper production, the printing press is followed by machines capable of processing printed products ready for shipping, for example, machines with processing stations or an insertion machine with feeders for feeding intermediate or initial products and/or supplements from a pull-off station to a main product. The machines further convey the printed product, produced in this way, to stacking devices and addressing, foil-laminating or hoop-casing machines.

Suitably trained operators are required for operating these machines and for making corrections. For example, the speed must be changed or axes must be adjusted with an electrical actuator. In particular, actuators must be adjusted positively or negatively for optimization or correction, as in, for example, an axis being moved to a limit stop or being initialized or positioned in accordance with a specific value. For corrections and optimizations of this type, each machine is respectively provided with several input devices, comprising a keyboard for entering the changes and a display unit for displaying operating states and error messages. If a correction must be made at a processing station, for example, a back cutter, then the operator authorized to perform this task enters corresponding correction commands at the input device that is fixedly assigned to the processing station. The commands are transmitted to the control unit, which adjusts the electrical actuators.

In practical operations, systems of this type have long proven successful. However, complex systems, for example, book binding lines with several processing stations, are comparatively expensive and involved. Thus, the need for simplifying the configuration and operation of these lines has existed for some time.

SUMMARY OF THE INVENTION

It is an object of the invention to create a system of the aforementioned type, which distinguishes itself through a simpler and more cost-effective design, but which nevertheless operates safely.

The above and other objects are solved according to the invention by a system for producing printed products, the system comprising machines with several processing stations, which form a production line, the system comprising: at least one control unit for controlling the processing stations of a machine; and at least one freely movable input means for operating the processing stations via the at least one control unit, wherein a position of the at least one input means is automatically detectable.

With the system according to the invention, a single input means is sufficient to locally operate the processing stations of one or several machines and make adjustments, corrections, optimize the operation, acknowledge errors and for the start and stop operations. It is no longer absolutely necessary to have fixedly installed operating units on the machines. In particular for systems with many processing stations, this represents a considerable cost savings since the respective operating units can be omitted. Thus, the invention allows using a single input means at a non-central location for making corrections and optimizing the operation at the various processing stations, even for complex and involved systems, such as book binding lines.

The input means can be a comparably simple device, for example a mobile telephone, a personal digital assistant (PDA) or a similar communication device, equipped with a code carrier for position detection. For position detection, each processing station to be operated can be provided with a code reader that detects the device or the mobile telephone within a specified peripheral area and reports the detection to a control unit. Also possible is a design where the input means is provided with a code reader and the individual processing stations are respectively provided with at least one code carrier. The position in that case is detected with the input means and via the code carrier provided at the processing station, so that the input means transmits its position and identity via known communication means to the control unit. However, the position can also be detected with other means, for example, with a GPS (global positioning system), wherein the mobile telephone keyboard and its display form the interface. By using a personal mobile telephone with a personal code carrier, the operator can be clearly identified.

According to one modification of the invention, the authorization to operate with respect to individual processing stations and/or different types of manipulations can be regulated particularly easily if a databank is provided, in which the desired authorization for the operator or operators is stored. Authorizations of this type can be changed and monitored easily.

The input means according to another modification of the invention is preferably designed such that corrections can be carried out at an adjacent processing station. However, according to yet another modification the input means can also be designed such that corrections can be made at a more remote, manually selected processing station. As a result, the operation of, in particular, very long systems is considerably simplified and accelerated.

BRIEF DESCRIPTIONS OF THE DRAWINGS

Exemplary embodiments of the invention are explained in further detail in the following with the aid of the drawings, in which.

DESCRIPTION OF PREFERRED EMBODIMENTS OF THE INVENTION

Figure 1:
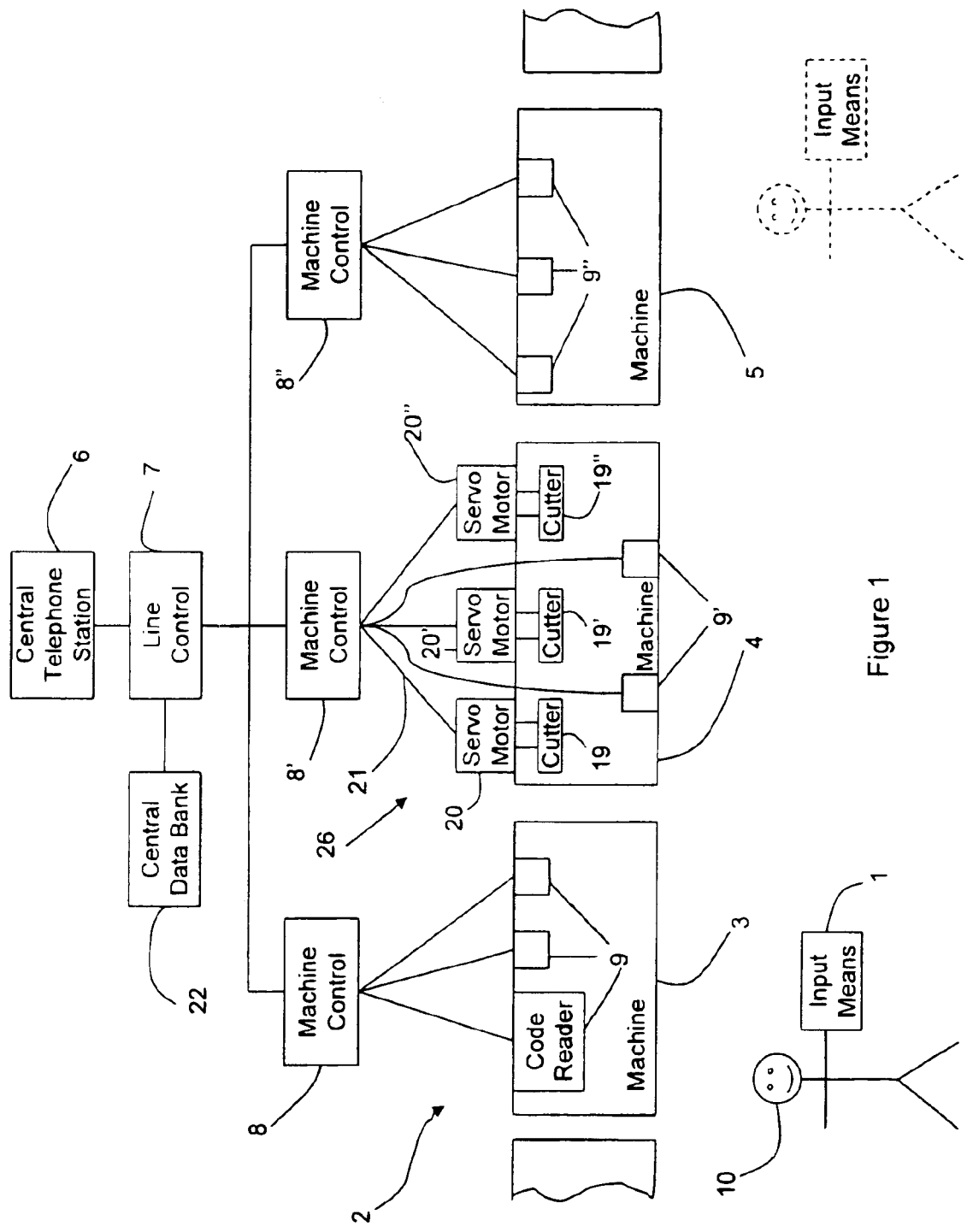
FIG. 1 shows a schematic view of a detail of a system according to the invention.

The system 2 shown in FIG. 1 is a book binding line, comprising several machines 3, 4 and 5 for producing a book, not shown herein. In FIG. 1, the printed products are processed with these machines, for example, in a line extending from the left to the right. The machines 3, 4 and 5 are, for example, gathering machines, transfer means, adhesive binders, cutting devices and foil-laminating machines. However, the system 2 can also be another product line in the print-processing industry, for example, a gathering and wire-stitching system. Systems of this type are well known to the person skilled in the art.

The above-described systems generally are provided with a computer-supported control unit.

Figure 2:
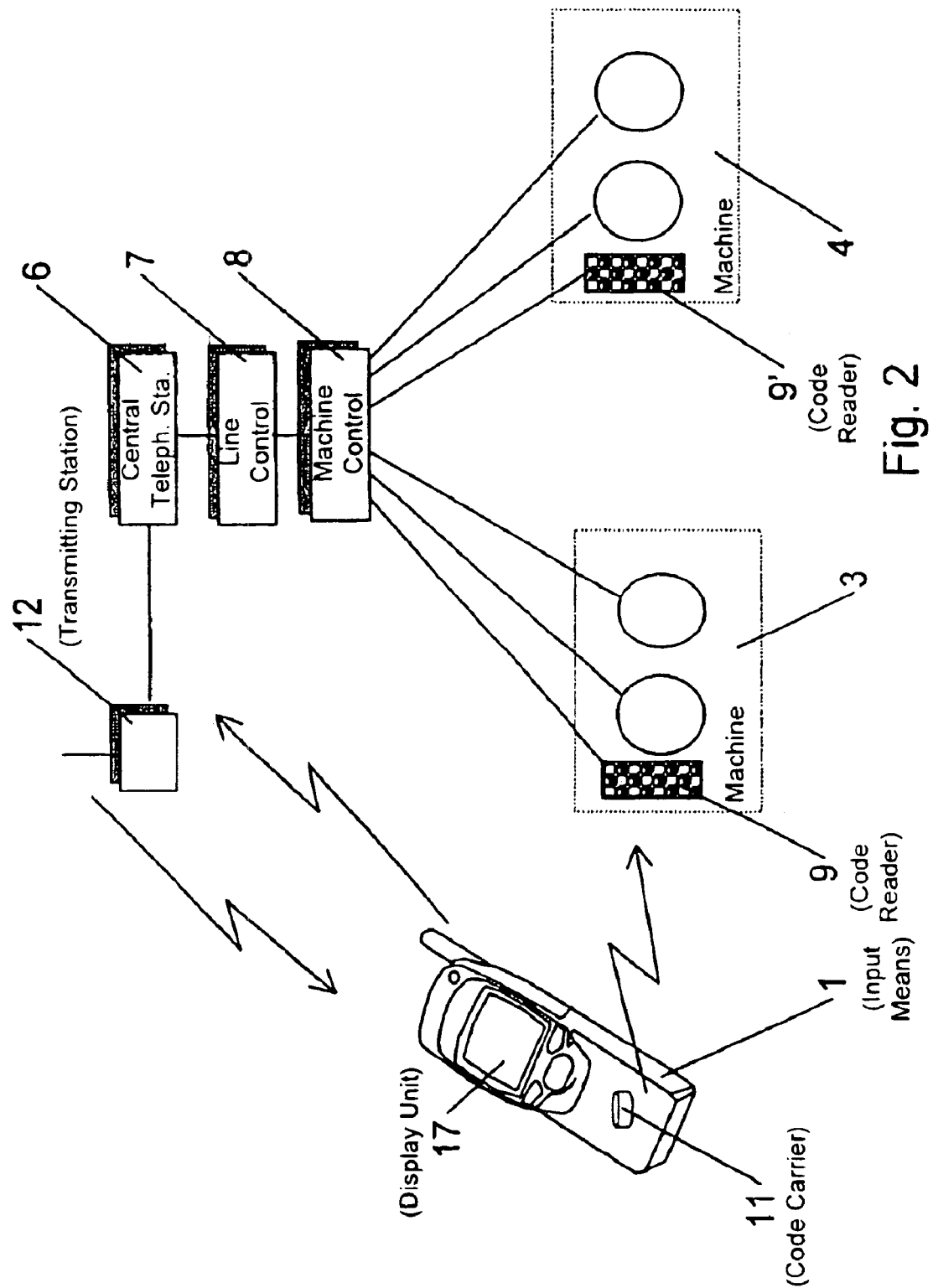
FIG. 2 shows a schematic view of the joint operation of input means and control unit.

The machine 4 is provided with a back cutter 19, for example, the position of which can be adjusted with a servomotor 20. Additional cutters 19' and 19" controlled by servomotors 20' and 20" are also shown. The servomotors are controlled with a machine control 8', which is connected via signal line 21 to the machine 4. The remaining machines 3 and 5 are respectively also controlled via correspondingly assigned machine controls 8 and 8". The speed of, for example, back cutter 19 is corrected with an input means 1, which is used by an operator 10 in FIG. 1. This input means 1 is freely movable and is preferably designed as an easy-to-handle device, for example, the mobile telephone indicated in FIG. 2. This mobile telephone can be linked to a central telephone station 6 for transmitting the signals. The central telephone station 6 preferably is the central in-house switchboard. However, a different type of wireless signal transmission is possible as well, for example, with the aid of infrared rays.

The input means 1 is provided with a code carrier 11, and each machine 3, 4 and 5 that can be operated is provided with at least one code reader 9. If the operator 10 with the input means 1 approaches the processing station 4, for example, the code reader 9' identifies the presence of the input means 1 and reports contact to the machine control 8'. The machine control 8' then, in turn, transmits, via the line control 7 of the central telephone station 6, all necessary information for activating a display 17 of the input means 1, for example, a liquid-crystal display. The machine control 8' subsequently transmits via the line control 7 an operating mask of an activated operating location to the central telephone station 6, which transmits the data via a transmitting station 12 to the input means 1.

Figure 3:
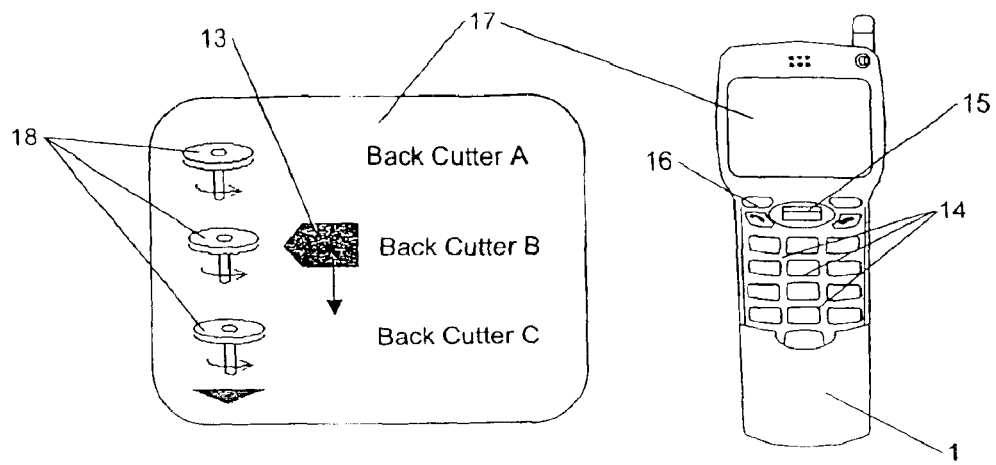
FIG. 3 shows a schematic diagram of an input means and a display unit, with an overview, showing the functions that can be activated at one processing station.

A suitable operating mask for operating the machine 4 is shown on the left in FIG. 3. Three back cutters A, B and C for the machine 4 are shown as illustrations 18 on the display unit 17. By pushing a button 16—or making a selection on a touch screen—a cursor 13 can be moved toward the desired back cutter A, B or C. The selection of the respective back cutter A, B or C can be confirmed with a key 15.

Figure 4:
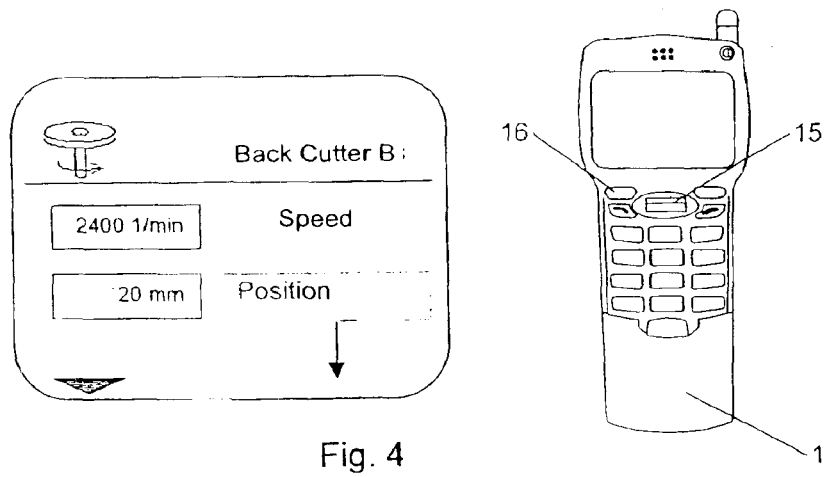
FIG. 4 shows a different view according to FIG. 3.

Following the selection, the display shown in FIG. 4 appears with details of the selected functions, which in this case are the speed and the position. Values can be input with the keys 14, and slidebars can be displaced with a suitable key 16, so that the desired speed or position of an axis, for example, can be adjusted. Both positions or one or the other position can optionally be adjusted with a suitable key and the correction can be made, which in this case is made via the machine control 8' at the servomotor 20. With the position shown in FIG. 1, machine 4 can now, in particular, just be corrected or optimized.

Figure 5:
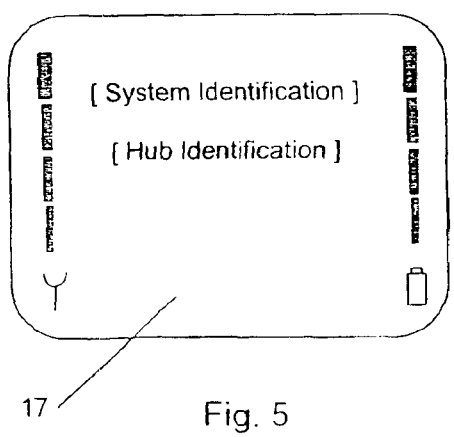
FIGS. 5 and 6 show additional views of the display unit.
Figure 6:
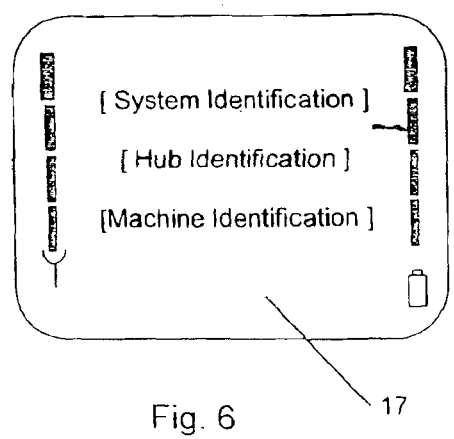

FIG. 5 illustrates a normal state for the display unit 17, showing the telephone system and naming the relay station (hub identification), the field intensity and the battery-charging state. FIG. 6 shows the condition of display unit 17 during an approach to one of the machines 3, 4 or 5.

The operator 10 in FIG. 1 must move to the right, meaning to the position shown with dashed lines, for example, to optimize the machine 5. The code reader 9" identifies the presence of the input means 1 and reports contact to the machine control unit 8". All further steps are identical to the ones explained for the above example of machine 4. The operating mask that appears on the display unit 17 is designed for the machine 5.

An automatic detection of the location or the position of the input means 1 relative to the machine 3, 4 or 5 is therefore essential to the invention and is achieved for the exemplary embodiment shown with the code reader 9, 9' and 9" and the code carrier 11. However, different means for detecting the position can also be used, for example, a GPS (global positioning system) or other positioning system.

The operator 10 can be clearly identified through the use of a personal input means 1 with a personal code carrier 11. For this, the operator's authorization to operate the individual machines 3, 4 and 5 is stored with the aid of a system administrator in a central data bank 22. The authorization to operate can also refer to the different types of manipulations. For example, the operator 10 can be authorized only to optimize the machine 4 and on this machine only one function such as the speed. Suitable embodiments of the code reader 9 as well as the code carrier 11 are well known. The code carrier 11 can be mounted on the outside of the input means 1, for example, or on a replaceable part of the input device, which is not shown herein.

The system 2 according to the invention is thus provided with the following functions:

1. An operator interface is made available to the operator 10 with the keys 14, 15 and 16 and the display unit 17.
2. The location of the operator 10 at one of the machines 3, 4 and 5 is detected precisely, so that an operator dialogue can run down selectively on one of the processing stations 26 in the machines 3, 4 and 5. The location is detected, for example, with the aid of the code reader 9 and the code carrier 11. However, other detection means can conceivably be used as well, for example, a GPS.
3. The operator 10 is clearly identified, and the authorization to operate, with respect to individual processing stations and/or types of manipulations, can be checked. The authorization is advantageously checked with the aid of code readers 9, 9' or 9" and the code carrier 11, as well as the central data bank 22, but other means are conceivable as well. An identification is possible, for example, through voice recognition, for which suitable devices are known per se. Acoustic voice operation of the system is possible as well. For this, microphones are integrated into the machines 3, 4 and 5, as explained in the following with the aid of FIG. 7. The input means 1 is the operator 10 or the generated sound itself. The position can be detected, for example, by aiming the microphones accordingly. For the operator 10 position shown in FIG. 7, for example, the sound waves emitted by the operator 10 and received by the microphone 23', installed in the machine 4', are considerably stronger than those received by the corresponding microphones 23 and 23" in machines 3' and 5'. This is shown schematically in FIG. 7.

Figure 7:
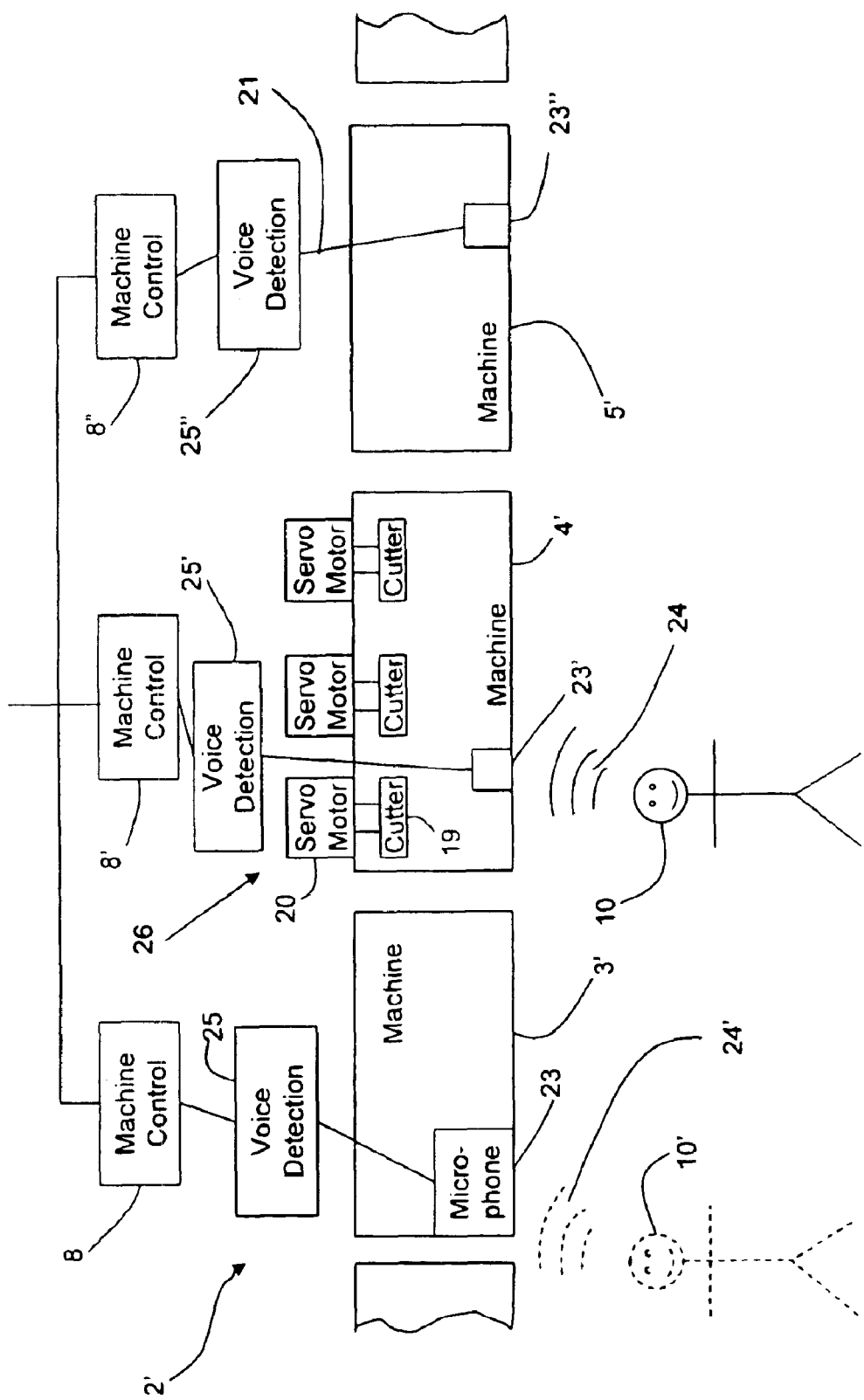
FIG. 7 shows a detail of a system according to one of the variants.

The system 2' shown in FIG. 7 comprises the machines 3', 4' and 5', as explained in the above, which comprise in particular processing stations for a book binding line. The machines 3', 4' and 5' in this case are also controlled by control units 8, 8' and 8". Each of these machines 3', 4' and 5' has a microphone 23, 23' or 23". In order to make a correction to a processing station 3' inside the machine, for example, the operator 10 moves to the position shown in FIG. 7 with drawn-out lines and uses a voice command to transmit the correction values to the machine 4'. That is to say, the values are transmitted via acoustic waves 24 to the microphone 23'. The microphone 23' is designed such that it only picks up sound waves 24 coming from a specific peripheral region around the machine 4'. The same is also true for the microphones 23 and 23". For example, if the operator 10 is in the position shown in FIG. 7 with dashed lines, the sound waves 24' are recorded only by the microphone 23 of machine 3' and are converted to electrical signals for the control unit 8. The microphones 23, 23' and 23" thus form a locating system. The control commands picked up by the microphone 23, 23' or 23" are respectively checked with voice-detection means 25, 25', or 25". The signals are ignored if they can not be assigned to an authorized operator 10.

It is furthermore conceivable in this case that the background is blanked out with a triangulation computation. The identification is thus ensured through voice recognition means 25, and only authorized operators 10 can input the correction values. Voice-recognition means are generally known to the person skilled in the art and do not need to be explained further. For the exemplary embodiment according to FIG. 7, the sound waves 24' function as the above-explained input means.

Further embodiments of the invention are envisioned. For example, the system may utilize one or more hands-free microphones.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A system for producing printed products, said system comprising machines with several processing stations, which form a production line, the system comprising:

at least one control unit for controlling the processing stations of a machine;

at least one freely movable input means for operating the processing stations via the at least one control unit; and at least one electronic data bank in which at least one authorization to operate for at least one operator is stored, wherein the at least one authorization to operate specifically applies only to at least one individual processing station, and wherein the at least one authorization to operate specifically applies only to at least one type of manipulation of said at least one individual processing station, and wherein a position of said at least one input means relative to the processing stations is automatically detectable.

2. A system for producing printed products, said system comprising machines with several processing stations, which form a production line, the system comprising:

at least one control unit for controlling the processing stations of a machine;

at least one freely movable input means for operating the processing stations via the at least one control unit; and at least one electronic data bank in which at least one authorization to operate for at least one operator is stored, wherein the at least one authorization to operate specifically applies only to at least one type of manipulation of at least one processing station, and wherein a position of said at least one input means relative to the processing stations is automatically detectable.

3. A system for producing printed products, said system comprising machines with several processing stations, which form a production line, the system comprising:

at least one control unit for controlling the processing stations of a machine; and at least one freely movable input means for operating the processing stations via the at least one control unit, wherein a position of said at least one input means relative to the processing stations is automatically detectable, and wherein at least one processing station comprises at least one actuator, the at least one actuator being used in conjunction with said at least one input means to control at least one of speed and position attributes of said at least one processing station.

* * * * *